Sept. 17, 1963 P. E. GIES 3,103,993
LINEAR HYDRAULIC DAMPER
Filed Dec. 9, 1959 2 Sheets-Sheet 1

Fig.1

Inventor
Paul E. Gies
by Hill, Sherman, Meroni, Gross & Simpson Attys.

Sept. 17, 1963  P. E. GIES  3,103,993
LINEAR HYDRAULIC DAMPER
Filed Dec. 9, 1959  2 Sheets-Sheet 2
Fig_3
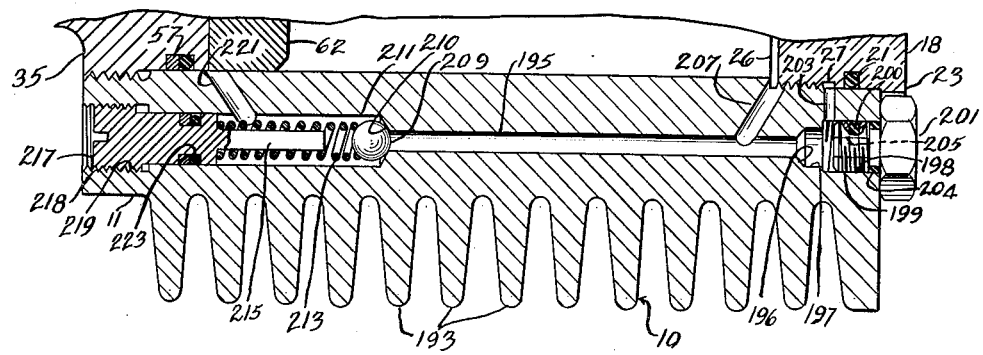
Fig_2
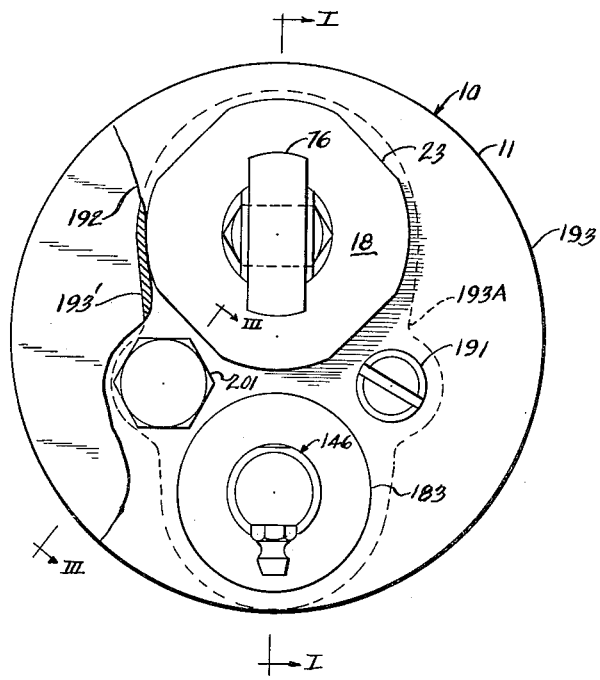
Inventor
Paul E. Gies

United States Patent Office 3,103,993
Patented Sept. 17, 1963

3,103,993
LINEAR HYDRAULIC DAMPER
Paul E. Gies, Snyder, N.Y., assignor to Houdaille Industries, Inc., Buffalo, N.Y., a corporation of Michigan
Filed Dec. 9, 1959, Ser. No. 858,402
9 Claims. (Cl. 188—96)

This invention relates to linear or direct acting types of dampers or shock absorbers, such dampers being adapted to be connected, preferably directly, between two relatively movable parts to dampen motions therebetween.

It is an object of this invention to provide an improved damper of this general type having a plurality of interrelated features cooperating to provide such a unit which is effective in operation and yet is simplified and more economical or of lower cost in its construction and manufacture.

A further object of my invention is to improve the preferably manual, adjusting means for the position of the damping valve to provide a fine adjustment, easy accessibility, and to prevent any lost motion in such connection.

Still another object of this invention is to reduce the compensation response time, in dampers of this general type, to a minimum by a forced and reversing circulation of the working liquid through or along improved types of inner and outer passageways, which in my preferred and exemplary embodiment, are inside and outside of a tubular temperature compensating rod element.

Another object of my invention is to increase the life and damping capabilities of dampers of this type by the provision of an improved arrangement of integral cooling fins on the working cylinder and particularly to provide such improved cooling fins on all needed surfaces of a single unit, providing the working cylinder and the replenishment cylinder, to thereby materially increase the heat dissipating abilities of said combined and, preferably, integral unit.

Still another object of my invention is the provision in dampers of this type of an improved replenishment cylinder and operative connections therefor to the working cylinder.

These and other objects, features, and advantages of the present invention will be readily apparent to those skilled in the art of dampers or the like from the following description of a preferred embodiment thereof, taken in conjunction with the accompanying drawings in which:

FIGURE 1 is a longitudinal, sectional view of a damper embodying the features of my invention and is shown with portions of its length broken away to save space and with certain interior portions thereof not shown in section;

FIGURE 2 is an end view taken from the right end of the damper shown in FIGURE 1; and FIGURE 3 is a partial, sectional view taken on line III—III of FIGURE 2.

In the embodiment of this invention illustrated in the accompanying drawings, reference character 10 designates generally or as a whole a direct acting damper of the linear type which may be used to advantage in various applications requiring a direct action or linear damper.

The damper is designated as a whole by 10 and includes an outer housing portion 11. Preferably 11 is formed in one piece to include the cooling fins, the working cylinder, and the replenishment cylinder, all as hereinafter described in greater detail.

The preferably, but not necessarily, one-piece body or housing member 11 is illustrated in the present exemplary embodiment, as having as an integral part thereof, the walls for the working cylinder 12, which are defined by the axially extending, uniform diameter, and smoothly finished cylindrical bore 13. For ease of manufacture this bore 13 extends through from one axialy end to the other of the elongated body 11, but is located to one side of, or eccentrically, therein as illustrated in FIGURES 1 and 2. The ends of this uniform cylindrical bore 13 have internally threaded portions 15 and 16 of preferably the same diameters and lengths. These threaded portions are shorter than the corresponding internally enlarged portions at the ends of said bore 13. End closure members are threadedly received and secured, as well as sealed, in these end threads 15 and 16.

The partly open or piston rod end of working cylinder 12 is closed and sealed by the end closure or plug 18 externally threaded at its inner end at 19 to be received in threads 15 between the enlarged and non-threaded portions 26 and 27 as shown. Closure 18 has outwardly from its threads a suitable sealing means 21 comprising a groove containing a suitable sealing O-ring. The outer end of 18 is enlarged to rectangular faces at 23 providing an annular face 24 to be tightly engaged with the end of body 11.

The other end of the working cylinder forming bore 13 may be closed by a suitable member, such as the cylinder extension member 33, which is rigidly connected to the cylinder body by having the enlarged end 35 of this extension 33 threaded, as at 37, and received in threads 16. These cooperating threads have an inner non-threaded portion as shown at 38.

Additional locking and indexing means may be provided by a plurality (here three) of matched holes 29 and 30 in body 11 and extension 33 respectively to receive a grooved type lock pin 31.

The enlarged end 35 has, at its inner end, suitable sealing means 39, here comprising the groove and in sealing O-ring, to engage the bore 13 as shown.

The cylinder body extension member 33 has an intermediate, reduced diameter portion 41, the length of which is broken away for convenience in FIGURE 1. This length of the intermediate portion 41 may be of any suitable value but preferably, is approximately the same as the internal length of the entire working cylinder 12.

The outer end of extension 33 has the usual eye formed by an enlarged portion 43 having a suitable pivotal and connecting engagement to one of the relatively moving bodies to be damped by this damper. Portion 45 contains a suitable bushing structure designated as a whole by 45 and which may be periodically lubricated by fitting 46. Since such bushings are well known in the art, the details of this structure are not illustrated in further detail.

As shown in FIGURE 1, the cylindrical bore 47 extends throughout most of the length of extension 33.

The variable displacement air chamber 50 defined by this bore 57 has a suitable air vent or orifice such as 49, preferably located adjacent its outer end as illustrated to provide for the restricted flow of air in and out of chamber 50 upon motion of the working piston in either direction. It will be understood that this arrangement may, if desired, be used to provide an additional air damping in a desired amount by provision of the desired amount of air damping restriction at orifice 49.

The inner end of cylindrical chamber 50 has a reduced diameter, at portion 53, which is internally machined and finished for a suitable working fit on the corresponding external diameter of the elongated and generally tubular piston extension member 55, which reciprocates therein. These two members may have a suitable seal 57 therebetween comprising the groove in part 35 containing an O-ring and a back up ring, as well understood in this art.

The movable piston assembly is designated as a whole by 60. In addition to its extension 55, it includes the rigidly connected piston 62, preferably integral with its actuating piston rod or extension 63 and with its far end extension or reduced portion 64.

For convenience and economy in manufacture, the piston unit 62, 63, 64 has its inner and axially extending bore 65 extending through from end to end thereof like the bore 13 in body 11.

This bore or cylindrical passage 65 comprises the usual tapered end portion 67, the cylindrical bore portion 68, the slightly enlarged diameter cylindrical bore portion 69 and the end bore portion 70, which may, if desired, be slightly enlarged, as shown. This outer end 70 (of bore 65) is suitably, internally threaded, as at 72, to receive the corresponding external threads 73 of the eye bolt or end connector member 74. This member has the usual enlarged end portion 76 to be pivotally connected to one of the two relatively moving bodies to be damped by this unit 10 by pivotally receiving a pin through its suitable bushing structure which is designated as a whole by 77. This bushing is not illustrated in detail herein since it, and its conventional lubricating fitting 78, may be of any suitable types as is well understood in this art.

74 may be locked by a suitable lock washer 81 and retained by a nut 80, threaded thereon. It will be noted that member 74 closes and seals the outer or exposed end of the bore 65 against leakage of any hydraulic liquid that may pass the inner seals in this same bore.

The other end of this bore 65 (or its portion 68) is closed and tightly sealed by the rigidly connected and tightly fitting plug 83, which is machined and finished to match the correspondingly finished portion of bore 68 to seal the end of passage 65. Plug 83 is locked in place by suitable means, such as the transversely extending pin 85 extending therethrough and through the corresponding hole in the integral piston extension portion 64.

The outer end of the preferably integral piston extension 64 has a threaded portion 87 engaged in the correspondingly threaded portion 88 of the inner end piston extension 55, which has almost all of its length hollowed out by the bore 89, to thereby reduce its weight and to increase the volume of air in expansible chamber 50.

The hydraulic fluid or liquid has its major or working communication from one side to the other of the piston 62 by means of a passage comprising the, preferably, angularly bored port 91 communicating with the central bore 65, which in turn opens out to the other side of the piston through the transverse port 92. Port 91 cooperates with a variable restricted orifice forming, or valve member, 94, which has a suitably tight working fit in bore portion 68. Member 94 is adjustable, as hereinafter described, to vary the size of this shock absorber damping orifice and, thereby, its effective damping in both directions.

This orifice defining member 94 is mounted on tube 97, for example, by a suitable locking or indexing member 95.

Tube 97 extends throughout almost the entire length of bore 65 and is secured, and sealed, at its outer end in a spool member, or valve stem extension, 97a. This member has a correspondingly shaped and sized recess 98 extending in for a suitable distance from its inner end to tightly receive the outer end of tube member 97 to which it is secured, for example, as by a transverse pin 99 extending through both such members.

The adjusting member 97a has suitable sealing means 101 (comprising, for example an O-ring and back up ring) acting against the bore portion 70.

Slightly inward from its tapered outer end 106, the adjusting member 97a has two spaced cams or slopes provided by the inwardly extending conical surface 103, the intermediate and reduced diameter cylindrical surface 104, and the spaced and cooperating conical surface 105.

Two threaded plugs or set screws 107 and 109 are threaded into correspondingly threaded holes in the integral piston rod portion 63, with the threads thereof being locked by suitable and well-known friction inserts, such as 108 and 111 respectively.

The set screws or plugs 107 and 109 have conical inner ends having the same slopes as the spaced apart conical faces 103 and 105 on the spool-like adjusting member 97a, which they engage, as shown, to provide an improved adjusting means for the damping orifice.

It will be noted that the transversely extending adjusting screws are actually spaced apart a distance corresponding to approximately the center of the two conical slopes or cam portions 103 and 105 to thus provide for a highly sensitive and improved differential type of action in the adjustment, as well as in the locking, of the spool adjusting member 97a and its connected orifice regulating member 94. It will be understood, that for adjustment in either direction, the appropriate one of said screws or plugs is screwed outwardly, and then the other plug or screw is screwed in or out to position the valve or orifice defining member 94 to thereby set or determine the desired degree of damping for this unit. It will be noted here that either of these screws or plugs may be considered as acting as a lock screw or lock means for the other.

In the foregoing, elongated member 97 has been considered as a rod, extending down along through the center of a piston rod or its extension and, preferably, with its extension 97, extending out beyond the end of the casing as shown in FIGURE 1. Thus screws 107 and 109 are beyond the end plug 18 when the damper is fully collapsed. This assures accessibility for the damping adjustment in any position of the piston and also provides for an economical manufacture.

It is also to be noted that elongated rod member 97 provides (with the associated tubular piston extension 63 in which it is mounted) a thermostatic adjusting means to increase or decrease the effective area of the damping orifice at the inner end of the port 91 for lower or higher temperatures respectively. This automatic adjustment provides a substantially constant value of the manually preselected degree of damping under a wide range of temperature conditions.

This temperature actuation of valve or orifice defining member 94 is achieved, as is well known in this art, by a bimetallic action in which, for example, the two members 63 and 97 are of different materials or metals having materially different coefficients of thermal expansion. This provides a differential valve adjusting action therebetween on changes in temperatures. Since portion 63 is preferably of steel the compensating member 97 is preferably of a material having a materially greater coefficient of expansion, such materials being well understood by those skilled in this art.

In the foregoing structure, elongated member 97 is preferably made hollow or tubular to permit the flow of hydraulic damping liquid therethrough.

In my preferred embodiment, and as illustrated, the effective cross-sectional area of the internal bore 113 of member 97 is substantially the same as the cross-sectional area of the annular passage defined between the bore 65 and the outside of member 97, so that these two passages may, if desired, have substantially equal flow velocities therein. It will be understood that these cross-sectional areas may be changed relative to each other to provide for differing desired values of local velocity therein.

It will be noted that the outer portion of tube 97 is ported by a suitable hole 114 extending through its side walls, adjacent to, and partially overlapped by, extension member 97a. These holes 114 provide for a return path for, or for reverse flow of, the damping liquid flowing down passage 113 which is returned by annular passage 114, or vice versa.

From the foregoing, it will be apparent that I have provided a long and reversed liquid flow path for the damping liquid which passes through the main damping orifice at 94. Thus, these two inner and outer passageways are in series with one damping orifice (and with the flow back and forth across the piston) during operation of this damper. It will be seen that this inner and outer flow path is of approximately twice the length of that of the entire working cylinder and provides for a desired degree of high velocity of the hydraulic damping liquid in its flow through each of said inner and outer passages.

The temperature compensating tube 97 is made of a material or metal having high thermal coefficient of expansion relative to the piston rod 60, to which it is secured. This tube 97 is covered, or bathed, inside and out and throughout substantially its entire length, by a relatively high velocity flow of the major part of the piston by-passing working liquid during reciprocatory action of said damper. This flow, and particularly the relatively high velocity thereof, provides for a superior and immediate heat exchange to instantly warm or cool the tube 97 in accordance with the temperature of the working liquid on its way from one side of the piston to the other. It is to be noted that, during the high intensity damping closing stroke of the piston, when all, or substantially all, of the flow passes through the orifice or valve member 91 (since the one way or check valve is closed during this stroke) the hydraulic liquid goes directly, after being heated by friction in the orifice, along through the center of tube 97 in passage 113 and then back around member 97 in annular passage 114, to immediately transfer its heat to the compensating member 97. This provides for a faster and more efficient compensating action.

It is also to be noted that, this long piston by-passing, inner and outer passage (having a length of approximately twice that of the working cylinder) may be, if desired, used to provide for an additional damping in addition to, and in series with, that of the orifice at 94. This additional damping will be of the laminar or viscous type and may, if desired, be used to thus modify the overall velocity response in the action of the damper as a whole.

Thus the tubular actuating member 97 (which is preferably also the temperature compensating tube) has several functions, as described above. The present improved arrangement provides for it to be heated or cooled more rapidly by reason of the improved heat transfer resulting from the relatively high velocity liquid flow immediately adjacent all surfaces thereof, that is, its inner and outer surfaces.

It will also be noted that the tight engagement of the adjusting screws or plugs 107 and 109 with the corresponding cam or conical slopes of member 97 precludes any possible lost motion after the readily accessible adjustment has been made.

Another aspect or feature of my invention, cooperating with other features to reduce the number of needed operations and the resulting labor and costs, resides in an improved method for the manufacture, assembly, and heat treating of a major part of the actuating piston subassembly. In a related aspect, I provide an improved structure, to permit a more economical manufacture.

To this end, the entire piston unit (comprising the piston 62, its inner end extension 64, and its integral or piston rod extension 63), the separate inner piston rod extension portion 55, the closure plug 83, and the plug rocking pin 85 are all made of a similar, and preferably identical, material, such as steel. This material is preferably a suitable precipitation hardening steel to thus permit final assembly of the several elements and a subsequent heat treatment thereof, while so assembled, without any relative and harmful differential expansions between such elements during such heat treatment and without any distortion thereof during such heat treatment. Thereafter, this previously assembled, and then heat treated, subassembly may be assembled into the rest of the cooperating structure without further machining or finishing operations.

In the foregoing, it is to be understood that the bore portion 68 is machined and finished for its working fit with orifice adjusting member 94, prior to such subassembly and heat treatment thereof. The same is true of all the other surfaces on this subassembly.

Another aspect of my invention resides in an improved replenishing chamber and its communicating passages to the working cylinder. The axially elongated, and preferably one piece, cylindrical body 11 is provided in my exemplary embodiment, with an axial, parallel, and immediately adjacent elongated, replenishing cylinder bore or chamber 120, which is formed by a preferably uniform diameter cylindrical bore 121 which for economy of manufacture (and like bores 13 and 65) opens out through both axial ends of body 11.

The cylindrical bore 121 has suitable end closures at each end thereof, with one such end closure having suitable means for the insertion, or addition, of additional shock absorber liquid when needed and, with an end closure (preferably the other one) having passages and recesses machined therein to provide for a one-way or check valve type of communication from the replenishing chamber 120 into the working cylinder 112 and also to provide for a filtered bleed orifice communication between chambers 12 and 120. This preferred and illustrated arrangement eliminates, or reduces to a minimum, the machining operations of any type in the internal bore 121 and substitutes therefor the easier and lower cost machining operations on the exterior of one of the plugs, or internal end closures, which preferably is at the other end from fitting 146, namely, plug 123, as illustrated.

The outer end of plug 123 is enlarged, and generally squared like 23, to be fitted tightly against the end of the body 11 when its threads 126 are screwed into the corresponding threads 125 formed in the end of the bore 121, and with a clearance 127 and 129 at each end of the threads. The clearance or groove 129 is cut into the exterior of the exterior of the plug to form an annular passageway. Outwardly of this passageway there is provided a suitable sealing means 130 comprising a groove containing side by side, an O-ring and a seal or back up ring, which are similar to the elements used in the seal means at 57 and at 100. The outer end portion of plug 123 has a similar seal means 128.

The inner end of closure 123 has an axial bore 131 communicating by transverse passages 134 and 135 with the annular groove or passageway 129. The outer end of passage 144 is enlarged as shown at 133 to receive means 132 to provide a filtered bleed orifice to thus provide for a restricted, and filtered, communication between the working cylinder 12 and the replenishing chamber 120 and to permit air to escape out from 12 through this filter screen orifice.

Passage 135 is enlarged as shown at 136 to receive a ball type one-way check valve 137 to permit the flow of the spring biased replenishing liquid into the working cylinder and to prevent the reverse flow during high pressure in the working cylinder, as during closing motion of the piston 62.

It will be noted that both passageways 135 and 134 communicate with the working cylinder 12 through the common port 138 which is drilled at an angle (reaching in from the open lower left hand end of bore 121) from chamber 120 into chamber 12 immediately adjacent to the inner end of its enclosure 55.

The replenishment liquid in 120 is held under pressure by a piston, such as 139, having a reduced and integral extension 140 terminating in a further reduced end portion 141. It has a bore or axial passage 142 extending therethrough from end to end for ease of manufacture, as noted above in connection with bores 13 and 121. The outer end of this bore has a conventionally tapered and threaded portion 144 to receive correspondingly tapered threads 145 on the fitting which is indicated as a whole by 146. This fitting is of a conventional type for receiving a connection to force in an additional supply of hydraulic liquid.

Portion 143 of bore 142 merges by a tapered portion 148 into a reduced diameter portion 149 which, in turn, communicates with an enlarged bore portion 151 having a shoulder against which the cylindrical plunger element 157 is seated. The outer end of 157 has sealing means 158, comprising a groove containing an O-ring as shown. An axial bore 175 extends through from the outer end of plunger 157. The inner end of this passage 175 is closed by a suitable valve element 171 biased onto its seat by spring 173 which is mounted in the enlarged bore portion 174. Bore 174, at its other end, receives and provides a seat for an open spring spider designated as a whole by 169 and having a central portion received in spring 173 and the tapered and enlarged end portion abutting against the other end of spring 173.

Spider 169 is, in turn, engaged on its other end by a suitable disc filter 167 which filters the entering liquid forced therethrough into the communicating axial passage 160 in the end closure 159. This end closure 159 has threads 161 and the cooperating thread engaging frictional insert 163 of a suitable friction material or plastic (like inserts 108 and 111). These threads and their insert engage the corresponding threads 155 of piston 139. Adjacent to the filter 167 and engaging it, is the seal O-ring in a groove as shown at 165. Piston 139 is provided with a similar seal 145 comprising a groove and O-ring as illustrated.

Piston 139 is biased to the left, as shown in FIGURE 1, by spring 179 acting against its other side through washer element 717. Element 181 is at its other end of the spring to, in turn, press against the end closure 183. The movable piston extension 140 is slidable in the closely fitting bore 188 in the end closure 183, as illustrated.

The heat dissipating capabilities of the damper according to this invention, are greatly increased by the fins 193 integral with the preferably unitary and generally cylindrical and elongated body portion 11. This body portion may be formed in any desired or suitable fashion; however, casting is preferred to facilitate the more economical forming of the fins 193 and other portions thereof. These fins, with their heat dissipation, increase the damping capabilities of the unit by reducing undue temperature rises of the liquid. This also increases the life of the damper as a whole by preventing exposure of internal seals and other parts to excessively high temperatures.

It will be seen that these fins are arranged to not only strengthen or reinforce the working cylinder 12, but to fill up the space or area between the two side by side cylindrical portions 12 and 120 to form the cylindrical body 11.

Thus, as shown particularly in FIGURE 2, these radially extending fins are of varying depth in different portions around the periphery of body 11, their bases or roots being indicated by the dotted line 193a, which abuts the continuous metal as seen at the roots of these fins in the broken away portion of FIGURE 2 at 193'. It is to be noted that the one piece or integral metal body 11 provides excellent heat transfer from the working cylinder 12, wherein the heat is generated, to the deeper fin portions, as seen at the lefthand and righthand sides of FIGURE 1, which have more heat dissipating ability because of their greater exposed areas.

As shown in the end view of FIGURE 2, the enlarged end portion 23 of plug 18 is partially squared off, to be received in a wrench or the like, like 124. Closure plug 191 seals off communication to another suitable, axially extending passageway parallel to 12 and 120, like passageway 195, as described below.

To provide the usually desired one-way type action (or for a greater damping action in one direction than in the other) there is an improved, and more economically manufactured, working piston by-passing passage having a one-way or check valve means therein.

This is illustrated in FIGURE 3, wherein the axially extending by-pass passage 195 is offset, and partially between, the cylindrical bores or chambers 12 and 120. Passage 195 likewise extends through one end to the other of body 11 to facilitate the lower cost manufacture thereof.

The central reduced diameter of portion 195 of this merges or is connected at its right end by a conical portion 196 to an enlarged bore portion 197 which in turn opens into an enlarged and threaded portion 198.

Threads 199 on the closure are engaged on thread 198. The end closure and bleeder screw or plug has the enlarged hex end 201 engaging seal 204, as shown. Also it has a bore 205 extending in from its inner end. Threaded portion 199 may be locked in position by a suitable friction insert or locking plug 200 (which like inserts 108 and 111) may be of nylon or other suitable material.

A transverse port or passageway 203 communicates the threaded bore 198 (inward from the end of the bleeder screw) with the groove 27 at the outer end of threads 15 and 19. As understood by those skilled in this art, this bleeder screw or plug and its associated passageways serve to hold the liquid in but permit the controlled outward bleeding of air from this damper. This bleeding is facilitated since the air bubbles tend to rise and this bleeder plug is generally, or is intended to be, at the upper end of the damper in its normal use.

By-pass 195 is connected by an angled port or passage 207 with the working cylinder 12 at the groove or slightly enlarged end portion 26. It will be noted that this angled passage 207 is arranged to be drilled or bored in at an angle from the right hand open end of chamber 12.

The other end of passage 194 has a part spherical seal 210 at the right end of the enlarged bore portion 211. Check valve ball 204 is held, or biased, into this seat by compression spring 213 which is received over the pin extension 215 of the closure plug 217.

Plug 217 is suitably sealed adjacent its inner end as by seal 223 comprising back up rings and an O-ring, as shown. The threads 218 of plug 217 are secured, but only partway, into the corresponding threads 219 as shown.

It will be apparent that this by-pass passage means and its ball check valve permits flow therethrough for one stroke and prevents flow therethrough for the opposite or closing stroke of the damper, as is well understood in this art.

It will also be understood that a substantially constant liquid volume in the working chamber 12 is provided, despite normal losses of liquid past the seals and despite temperature changes in volume of the liquid, by a spring pressed piston 139 in the replenishing chamber 120, and its communicating passageways, as described above.

It will be apparent, that in my preferred exemplary embodiment, all of the passages are substantially parallel and adjacent, and extend through from end to end of the casing. This provides for a more economical, or lower cost of, manufacture. This follows from the fact that the machining, boring, and finishing tools can be guided at each end, or can be worked or operated from each end. It will be apparent that this gives rise to a new and improved method of manufacture. Similarly, it is desirable that the larger cylinders, in particular the working or damping cylinder and the replenishment cylinder, have substantially uniform diameters from end to end. That is, their outer end portions are of the same or larger diameters as their interiors to thus permit easier machining and finishing operations.

It will also be apparent these large or full diameter ends for the several cylindrical passages facilitate the drilling and finishing of the transverse passages, such as 113.

It is to be understood, that while the several improved features of my invention have been illustrated and described in this exemplary embodiment as being used in connection with a linear type of damper of a particular structure and arrangement, yet these features may be used to advantage in other types of dampers, and various other modifications and variations of this invention may be made without departing from the spirit and scope of the novel concepts thereof and as defined in the appended claims.

I claim as my invention:

1. A linear type of hydraulic damper comprising an elongated, axially extending, one-piece case, a plurality of substantially parallel and adjacent cylindrical recesses extending axially through said case from end to end and having their end diameters at least as large as their internal diameters for easier and more economical internal machining and finishing thereof by the guiding and finishing tools at both ends through said open and full diameter ends, one of said substantially parallel cylindrical recesses providing a working chamber and having a damping piston reciprocably mounted therein with a damping orifice connection thereacross, end closures removably secured in each end of said working chamber cylinder, piston rod means extending out through one of said working cylinder end closures, another of said cylindrical recesses having end closures removably secured in each end thereof and providing a replenishment chamber enclosing a replenishment piston and a biasing spring therefor, said replenishment chamber having one-way entry means for additional liquid, and a third and smaller diameter one of said cylindrical recesses providing a piston by-passing passage to give one-way damping, said by-pass passage having end closures removably secured in each end thereof and communicating passage means connecting each end of said third cylindrical recess to the two sides of said damping piston.

2. An hydraulic, two-way, direct acting damper having a casing, a movable damping piston means therein and having a moving connection extending out through said casing, pivotal connections on said casing and on said connection extending out through said casing to be connected to two relatively movable bodies to directly damp vibrations therebetween in either direction, only an hydraulic damping passage connected across said piston means so that said otherwise closed piston damps in either direction of its motions and having a movable, manually adjustable, orifice varying valve means to vary the damping strength of said damper, a member rigidly connected to said movable orifice varying valve means, extending out through said casing for accessibility at all times, and having adjusting means rigidly connected on its accessible portion comprising a pair of spaced apart and oppositely facing slopes and a body having therein a pair of spaced apart screw means to engage said slopes to provide a differential type and hence very fine adjustment between any of a plurality of selected, adjusted, positions and positively lock said valve against lost motion in either direction.

3. An hydraulic, direct acting, linear, damper having an elongated casing, an axially extending cylinder therein having removable end closures, and axially reciprocable damping piston in said cylinder, a connecting rod secured to said piston and extending out through one of said cylinder end closures, an hydraulic damping passage in said piston and connecting rod and connected across said piston, a manually adjustable, orifice varying, valve in said passage adjacent said piston to vary the damping strength of said damper, said piston rod being of tubular form and having, in its hollow center, an elongated member rigidly connected to said orifice valve, extending out through said casing inside of said piston rod when said damper is retracted for accessibility at all times, and having adjusting means rigidly connected on its accessible end portion comprising a pair of spaced apart and oppositely facing cam slopes and a pair of spaced apart adjusting screws extending in, and accessible, from the outside of said piston rod to engage said slopes to thus provide a fine adjustment between any of an indefinitely variable number of selected, adjusted positions and hold said valve against lost motion in either direction in its selected, adjusted position.

4. An hydraulic, two-way, linear, direct-acting damper having a casing, a reciprocally movable damping piston means therein and having a linearly moving, reciprocating connection extending out through said casing, pivotal connections aligned with said piston on said casing and on said connection extending out through said casing, an hydraulic damping by-pass passage connected across said piston and having a manually and linearly adjustable, orifice varying, valve means to vary the damping strength of said damper, an elongated member rigidly connected to said orifice valve means and extending out through said casing for accessibility and having manually adjustable means rigidly connected on its accessible portion, said elongated manually adjusting rod-like member also being of a thermally expansible metal to provide a temperature compensating actuating means for said valve adjusting means by the thermal expansion of said metal, and means connecting said piston by-pass passage so that its flow in either direction is in heat exchange relation with said temperature compensating, elongated, rod-like member.

5. A linear type, two-way, direct-acting hydraulic damper comprising a casing having a cylinder therein, a damping piston reciprocable in said casing and having a rigidly connected and hollow actuating elongated member extending out through said casing, pivotal connections aligned with said piston on said casing and on said elongated member to be connected to two relatively movable bodies to damp vibrations therebetween in both directions, a passage connected to by-pass said piston including substantially the entire axial length of said hollow actuating member, said passage including a damping orifice and a damping strength and orifice regulating, valve therein adjacent said piston, a hollow valve actuating rod rigidly connected to said valve having a relatively restricted internal passage therein substantially throughout its length, said rod extending along inside of, and substantially the length of, said hollow actuating member, a relatively restricted annular passage along substantially the length of said hollow actuating member around said actuating rod communicating adjacent its outer end with said passage in said hollow rod to provide a combined passage length for said passage means of substantially double the length of said actuating member, said passage means being connected in series with said damping orifice, and externally accessible, manually adjusting means to engage the outer end portion of said hollow rod.

6. A direct acting, two-way, linear, hydraulic damper comprising a one-piece elongated, axially extending casing, an axially extending working cylinder in said casing, a substantially parallel and adjacent replenishment cylinder in said casing extending alongside of said working cylinder throughout a substantial part of its length, a damping piston reciprocably mounted in said working cylinder, a piston rod connected to said damping piston and extending out of said casing in only one end thereof, pivotal connections aligned with said piston on said casing and on said piston rod end to be connected to relatively movable bodies to damp vibratory motions therebetween in both directions to thus generate substantial amounts of heat in said casing, only a passage and orifice means connected across said piston for substantially equal damping flows of liquid in either direction therethrough, and circumferential and integral air cooling fins extending around both of said cylinders and substantially throughout their lengths to dissipate heat from both said cylinders and to strength both said cylinders against internal pressures, thus providing a generally cylindrical casing of one-piece and strong construction having a high heat dissipation ability to increase the efficiency and the life of said damper.

7. A linear, hydraulic damper comprising an elongated, axially extending casing, an axially extending working cylinder in said casing, a piston and piston actuating rod reciprocable in said working cylinder, said rod being connected at one end to one side of said piston and extending out through one end of said casing, an elongated and reduced diameter extension rigidly connected on the other side of said piston and sealingly slidable through the other end of said working cylinder, and air cylinder means having a vent orifice to outside air therethrough connected to said casing and enclosing said movable extension to form an expansible chamber therewith to pump air in and out thereof upon reciprocation of said damper to add to the damping action of said unit.

8. A direct acting, two-way, hydraulic damper comprising a casing having a cylindrical working chamber therein, a piston means reciprocably movable in said working chamber and having an externally and axially projecting connection therefrom, a generally cylindrical replenishment chamber along side of, substantially parallel to and adjacent said cylindrical working chamber, said replenishment chamber having a liquid supply means and a spring bias means therein, an internal end closure secured in one end of said replenishment cylinder, and a restricted passage means including an annular recess formed in and around said internal end closure and also bounded by the wall of said cylindrical replenishment chamber to provide for restricted communication between said replenishment cylinder and said working chamber.

9. A direct acting, two way hydraulic damper comprising a casing having a working chamber therein, a damping piston means movable in said chamber, an elongated hollow actuating member connected to said piston means and extending out through said casing, pivotal connecting means aligned with said piston on said casing and on said actuating member extending out through said casing, a passage means connected to by-pass said piston means, said passage means including a substantial part of the length of said hollow actuating member, said passage means being connected to include a damping orifice and a damping strength and orifice regulating valve adjacent said piston means, a hollow valve actuating, thermally expansible, temperature compensating rod connected to said valve and extending along inside of said hollow actuating member, said hollow rod being connected to communicate with said hollow actuating member adjacent its outer end to form part of said passage means, said passage means being connected in series with said damping orifice and means operatively connecting the outer end portion of said hollow rod to said actuating member.

References Cited in the file of this patent

UNITED STATES PATENTS

| | | |
|---|---|---|
| 1,314,266 | Hoffstatter | Aug. 26, 1919 |
| 1,492,328 | Lang | Apr. 29, 1924 |
| 1,880,234 | Bullock et al. | Oct. 4, 1932 |
| 2,043,465 | Clifford | June 9, 1936 |
| 2,122,407 | Chisholm | July 5, 1938 |
| 2,176,773 | Sparkes | Oct. 17, 1939 |
| 2,478,818 | Geiger et al. | Aug. 9, 1949 |
| 2,539,903 | Gruetjen | Jan. 30, 1951 |
| 2,676,676 | Strauss et al. | Apr. 27, 1954 |
| 2,685,729 | Daub | Aug. 10, 1954 |
| 2,714,429 | Etherton | Aug. 2, 1955 |
| 2,716,470 | Focht | Aug. 30, 1955 |
| 2,748,898 | Carbon | June 5, 1956 |
| 2,797,776 | Beyer et al. | July 2, 1957 |
| 2,851,128 | Kuhn | Sept. 9, 1958 |

FOREIGN PATENTS

| | | |
|---|---|---|
| 565,074 | Canada | Oct. 21, 1958 |
| 588,584 | France | Feb. 4, 1925 |
| 841,174 | France | Feb. 1, 1939 |
| 1,097,456 | France | Feb. 16, 1955 |
| 395,410 | Great Britain | Jan. 18, 1933 |
| 730,684 | Great Britain | May 25, 1955 |